(12) United States Patent
Sautron et al.

(10) Patent No.: US 11,305,878 B2
(45) Date of Patent: Apr. 19, 2022

(54) AIRCRAFT WITH ENVIRONMENTAL CONTROL SYSTEM

(71) Applicant: GE AVIATION SYSTEMS LLC, Grand Rapids, MI (US)

(72) Inventors: Dominique Patrick Sautron, Chicago, IL (US); Julian Alexander Opificius, Elk River, MN (US)

(73) Assignee: GE Aviation Systems LLC, Grand Rapids, MI (US)

( * ) Notice: Subject to any disclaimer, the term of this patent is extended or adjusted under 35 U.S.C. 154(b) by 0 days.

(21) Appl. No.: 16/917,213

(22) Filed: Jun. 30, 2020

(65) Prior Publication Data

US 2020/0331615 A1 Oct. 22, 2020

Related U.S. Application Data

(62) Division of application No. 15/043,517, filed on Feb. 13, 2016, now abandoned.

(51) Int. Cl.
| | |
|---|---|
| *B64D 13/00* | (2006.01) |
| *B64D 13/06* | (2006.01) |
| *F02C 6/08* | (2006.01) |
| *B64D 13/02* | (2006.01) |
| *B64D 15/00* | (2006.01) |
| *F02C 9/18* | (2006.01) |

(52) U.S. Cl.
CPC .............. *B64D 13/06* (2013.01); *B64D 13/02* (2013.01); *B64D 15/00* (2013.01); *F02C 6/08* (2013.01); *F02C 9/18* (2013.01); *B64D 2013/0607* (2013.01); *B64D 2013/0618* (2013.01); *B64D 2013/0648* (2013.01); *F05D 2220/323* (2013.01); *Y02T 50/50* (2013.01)

(58) Field of Classification Search
None
See application file for complete search history.

(56) References Cited

U.S. PATENT DOCUMENTS

| 3,441,045 A | 4/1969 | Malone |
| 3,842,720 A * | 10/1974 | Herr ...................... B64D 13/02 |
| | | 454/71 |

(Continued)

FOREIGN PATENT DOCUMENTS

| CA | 26806441 A | 3/2010 |
| CN | 103306821 A | 9/2013 |

(Continued)

OTHER PUBLICATIONS

Chinese Patent Office, Office Action re Corresponding Application No. 201780011161.2, dated Dec. 15, 2020, 8 pages, China.

(Continued)

*Primary Examiner* — Edwin Kang
(74) *Attorney, Agent, or Firm* — McGarry Bair PC

(57) ABSTRACT

An aircraft includes an environmental control system having a bleed air inlet, a gas turbine engine having a low pressure bleed air supply and a high pressure bleed air supply, and a turbo air cycle machine. The turbo air cycle machine includes a compressor fluidly coupled to the low pressure bleed air supply, as well as a turbine fluidly coupled to at least one of the low pressure bleed air supply or the high pressure bleed air supply.

13 Claims, 4 Drawing Sheets

(56) References Cited

U.S. PATENT DOCUMENTS

| | | | | |
|---|---|---|---|---|
| 5,114,103 | A | * | 5/1992 | Coffinberry .............. F02C 7/14 244/209 |
| 5,899,085 | A | | 5/1999 | Williams |
| 6,412,270 | B1 | * | 7/2002 | Mortzheim ............ F01D 11/04 415/144 |
| 8,904,805 | B2 | | 12/2014 | Hipsky et al. |
| 8,967,528 | B2 | | 3/2015 | Mackin et al. |
| 2007/0243811 | A1 | * | 10/2007 | Alecu ...................... F02C 6/08 454/155 |
| 2010/0170265 | A1 | * | 7/2010 | Whaling .................. F02C 3/32 60/785 |
| 2011/0162386 | A1 | * | 7/2011 | Chandrabose ........... F02C 9/18 60/785 |
| 2012/0260667 | A1 | * | 10/2012 | Chillar .................... F02C 7/18 60/779 |
| 2013/0174573 | A1 | * | 7/2013 | Hipsky .................... F02C 7/32 60/785 |
| 2013/0187007 | A1 | | 7/2013 | Mackin et al. |
| 2013/0232941 | A1 | | 9/2013 | Huang |
| 2014/0250898 | A1 | * | 9/2014 | Mackin .................... F02C 3/13 60/772 |
| 2015/0065023 | A1 | | 3/2015 | Bruno |
| 2015/0247463 | A1 | | 9/2015 | DeFrancesco |
| 2015/0251765 | A1 | * | 9/2015 | Jonqueres ............. B64D 13/08 62/86 |
| 2016/0177820 | A1 | * | 6/2016 | Schwarz .................. F02C 7/20 60/805 |
| 2017/0074172 | A1 | * | 3/2017 | Little ....................... F02C 6/08 |

FOREIGN PATENT DOCUMENTS

| | | |
|---|---|---|
| CN | 104343538 A | 2/2015 |
| EP | 2966278 A1 | 1/2016 |

OTHER PUBLICATIONS

International Search Report and Written Opinion issued in connection with corresponding PCT Application No. PCT/US2017/017600 dated May 12, 2017.

* cited by examiner

US 11,305,878 B2

AIRCRAFT WITH ENVIRONMENTAL CONTROL SYSTEM

CROSS-REFERENCE TO RELATED APPLICATION(S)

This application claims the benefit of and is a divisional of U.S. application Ser. No. 15/043,517, filed Feb. 13, 2016, which is incorporated herein by reference in its entirety.

BACKGROUND OF THE INVENTION

Contemporary aircraft have bleed air systems that take hot air from the engines of the aircraft for use in other systems on the aircraft including environmental control systems (ECS) such as air-conditioning, pressurization, and de-icing. The ECS can include limits on the pressure or temperature of the bleed air received from the bleed air systems. Currently, aircraft engine bleed systems make use of a pre-cooler heat exchanger to pre-condition the hot air from the engines to sustainable temperatures, as required or utilized by the other aircraft systems. The pre-cooler heat exchangers produce waste heat, which is typically exhausted from the aircraft without utilization.

BRIEF DESCRIPTION OF THE INVENTION

In one aspect, the disclosure relates to an aircraft including an environmental control system having a bleed air inlet, a gas turbine engine having a low pressure bleed air supply and a high pressure bleed air supply, a turbo air cycle machine having rotationally coupled turbine and compressor sections, an upstream turbo-ejector fluidly coupling the low and high pressure bleed air supplies to the turbine and compressor sections, and a downstream turbo-ejector fluidly combining fluid outputs from the turbine and compressor sections into a common flow that is supplied to the bleed air inlet of the environmental control system.

In another aspect, the disclosure relates to an aircraft including an environmental control system having a bleed air inlet, a gas turbine engine having a low pressure bleed air supply and a high pressure bleed air supply, a turbo air cycle machine including a compressor fluidly coupled to the low pressure bleed air supply and having a compressor outlet emitting a compressed air stream, and a turbine fluidly coupled to at least one of the low pressure bleed air supply or the high pressure bleed air supply and having a turbine outlet emitting a cooled air stream, and a turbo-ejector fluidly coupling the compressor outlet and the turbine outlet.

DESCRIPTION OF EMBODIMENTS OF THE INVENTION

Figure 1:
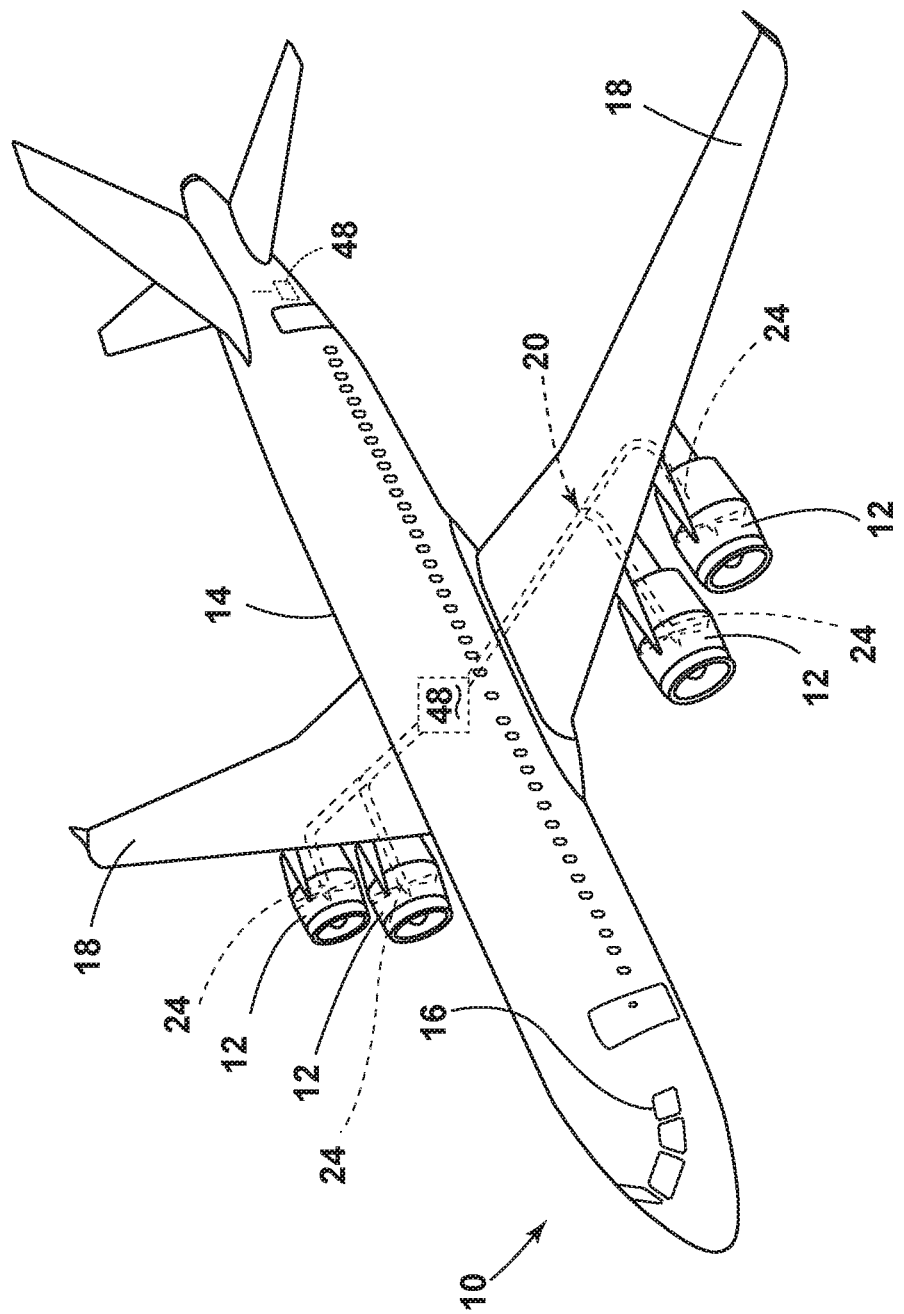
FIG. 1 is a perspective view of an aircraft having a bleed air system in accordance with various aspects described herein.

FIG. 1 illustrates an embodiment of the disclosure, showing an aircraft 10 that can include a bleed air system 20, only a portion of which has been illustrated for clarity purposes. As illustrated, the aircraft 10 can include multiple engines 12, such as gas turbine engines 12, a fuselage 14, a cockpit 16 positioned in the fuselage 14, and wing assemblies 18 extending outward from the fuselage 14. The aircraft can also include an environmental control system (ECS) 48. The ECS 48 is schematically illustrated in the fuselage 14 of the aircraft 10 and is fluidly coupled with the bleed air system 20 to receive a supply of bleed air from the engines 12.

The bleed air system 20 can be connected to each of the engines 12 such that high temperature, high pressure air, or a combination thereof received from the engines 12 can be used within the aircraft 10 for environmental control of the aircraft 10. More specifically, an engine can include a set of bleed ports 24 arranged along the gas turbine engine 12 length or operational stages such that bleed air can be received, captured, or removed from the gas turbine engine 12 as the corresponding set of bleed ports 24. In this sense, various bleed air characteristics, including but not limited to, bleed air mass flow rate (for example, in pounds per minute), bleed air temperature or bleed air pressure, can selected based on the desired operation or bleed air demand of the bleed air system 20. As used herein, the environmental control of the aircraft 10, that is, the ECS 48 of the aircraft 10, can include subsystems for anti-icing or de-icing a portion of the aircraft, for pressurizing the cabin or fuselage, heating or cooling the cabin or fuselage, and the like. The operation of the ECS 48 can be a function of at least one of the number of aircraft 10 passengers, aircraft 10 flight phase, or operational subsystems of the ECS 48. Examples of the aircraft 10 flight phase can include, but is not limited to ground idle, taxi, takeoff, climb, cruise, descent, hold, and landing. The demand of the bleed air system 20 by the ECS can be dynamic as, for example, subsystems are needed based on aircraft 10 conditions.

While a commercial aircraft 10 has been illustrated, it is contemplated that embodiments of the invention can be used in any type of aircraft 10. Further, while two engines 12 have been illustrated on each wing assembly 18, it will be understood that any number of engines 12 including a single gas turbine engine 12 on each wing assembly 18, or even a single gas turbine engine mounted in the fuselage 14 can be included.

Figure 2:
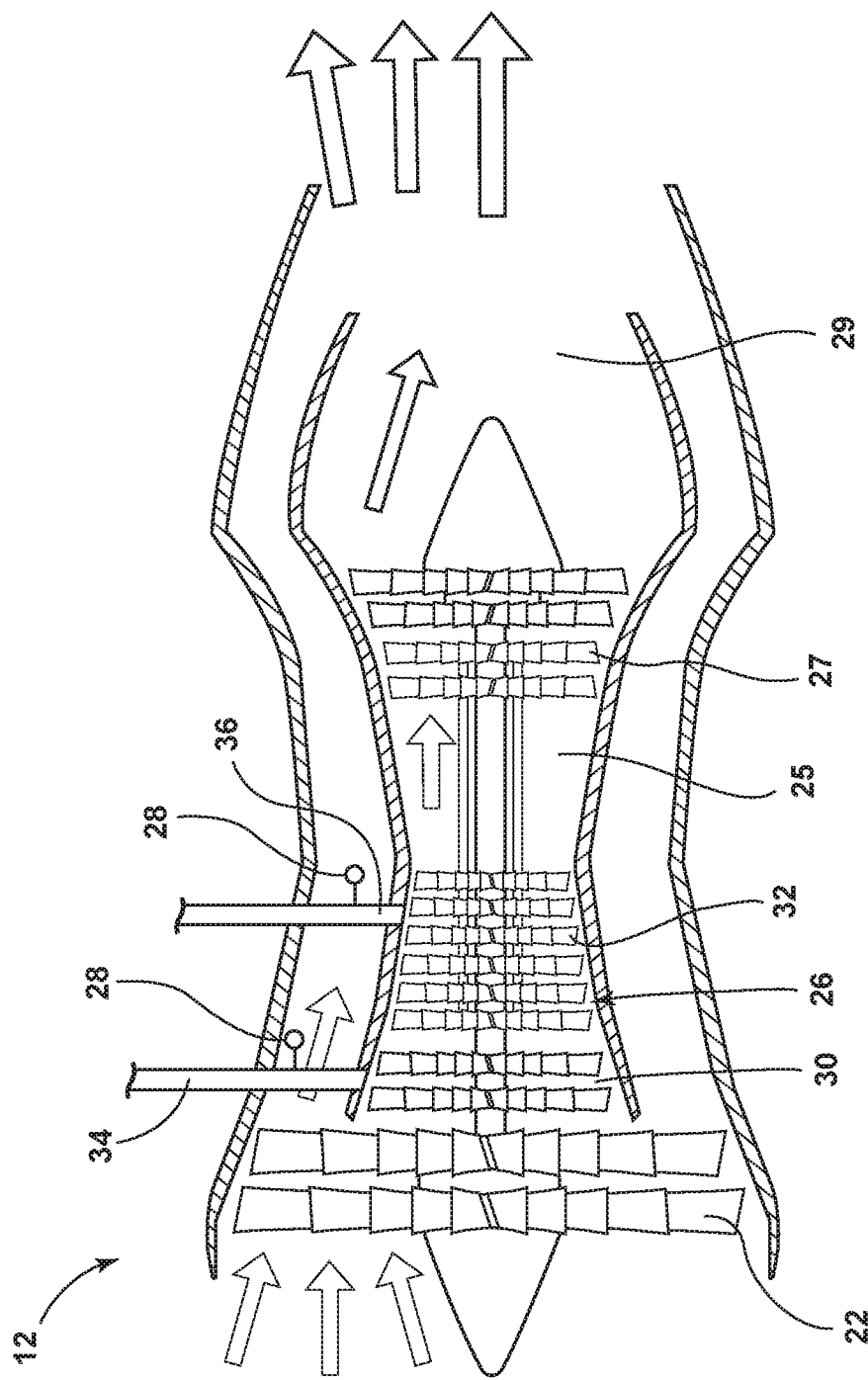
FIG. 2 is a schematic view of a portion of an exemplary aircraft gas turbine engine in accordance with various aspects described herein.

FIG. 2 illustrates a cross section of the gas turbine engine 12 of the aircraft 10. The gas turbine engine 12 can include, in a serial relationship, a fan 22, a compressor section 26, a combustion section 25, a turbine section 27, and an exhaust section 29. The compressor section 26 can include, in a serial relationship, a multi-stage low pressure compressor 30 and a multi-stage high pressure compressor 32.

The gas turbine engine 12 is also shown including a low pressure bleed port 34 arranged to pull, draw, or receive low pressure bleed air from the low pressure compressor 30 and a high pressure bleed port 36 arranged to pull, draw, or receive high pressure bleed air from the high pressure compressor 32. The bleed ports 34, 36 are also illustrated coupled with various sensors 28. By way of non-limiting example, the sensors 28 can include respective temperature sensors, respective flow rate sensors, or respective pressure sensors. While only a single low pressure bleed port 34 is illustrated, the low pressure compressor 30 can include a set of low pressure bleed ports 34 arranged at multiple stages of the compressor 30 to pull, draw, or receive various bleed air characteristics, including but not limited to, bleed air mass flow rate, bleed air temperature, or bleed air pressure. Similarly, while only a single high pressure bleed port 36 is illustrated, the high pressure compressor 32 can include a set of high pressure bleed ports 36 to pull, draw, or receive various bleed air characteristics, including but not limited to, bleed air mass flow rate, bleed air temperature, or bleed air pressure. Non-limiting embodiments of the disclosure can further include configurations wherein at least one of the low or high pressure bleed port 34, 36 can include a bleed port from an auxiliary power units (APU) or ground cart units (GCU) such that the APU or GCU can provide an augmented pressure and conditioned temperature airflow in addition to or in place of the engine bleed ports 34, 36.

During gas turbine engine 12 operation, the rotation of the fan 22 draws in air, such that at least a portion of the air is supplied to the compressor section 26. The air is pressurized to a low pressure by the low pressure compressor 30, and then is further pressurized to a high pressure by the high pressure compressor 32. At this point in the engine operation, the low pressure bleed port 34 and the high pressure bleed port 36 draw, respectively low pressure air from the low pressure compressor 30 and high pressure air from the high pressure compressor 32 and supply the air to the ECS 48. High pressure air not drawn by the high pressure bleed port 36 is delivered to the combustion section 25, wherein the high pressure air is mixed with fuel and combusted. The combusted gases are delivered downstream to the turbine section 27, which are rotated by the gases passing through the turbine section 27. The rotation of the turbine section 27, in turn, rotates the fan 22 and the compressor section 26 upstream of the turbine section 27. Finally, the combusted gases are exhausted from the gas turbine engine 12 through the exhaust section 29.

Figure 3:
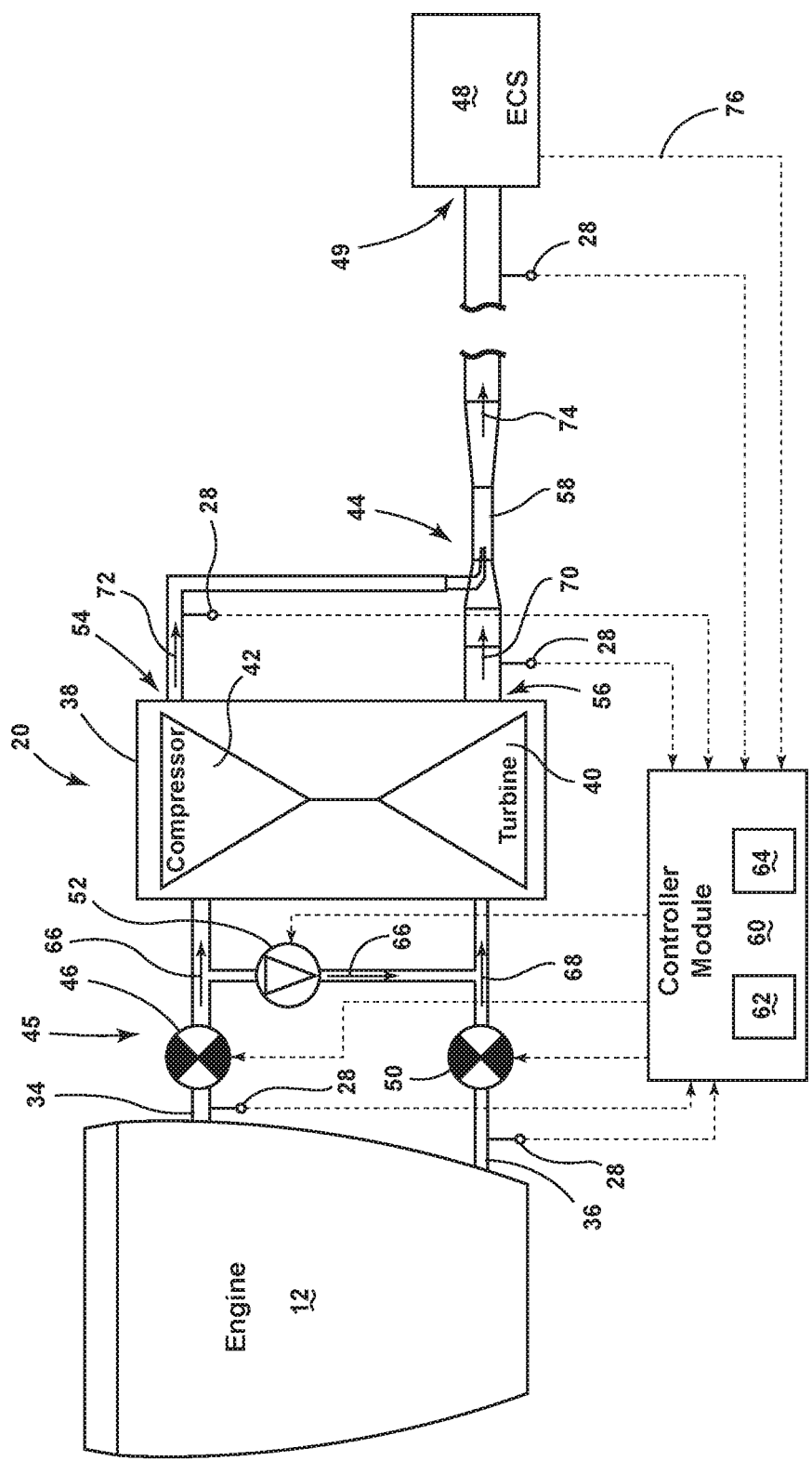
FIG. 3 is a schematic view of the aircraft gas turbine engine bleed air system in accordance with various aspects described herein.

FIG. 3 illustrates a schematic view of the bleed air system 20 of the aircraft 10. As shown, the bleed air system 20 can include a turbo air cycle machine 38 fluidly coupled upstream with the set of gas turbine engine (shown only as a single gas turbine engine 12) and fluidly coupled downstream with the ECS 48. The turbo air cycle machine 38 can include a turbine 40 and a compressor 42, such as a turbo compressor, rotatably coupled on a common shaft with the turbine 40. The bleed air system 20 of the turbo air cycle machine 38 can include a flow mixer or turbo-ejector 44 located downstream from the machine 38.

The low pressure and high pressure bleed ports 34, 36 can be fluidly coupled with the turbo air cycle machine 38 by way of a proportional mixing or controllable valve assembly 45. In one aspect, the mixing or controllable valve assembly 45 can be arranged to supply the low pressure and high pressure bleed air to the turbo air cycle machine 38. Non-limiting examples of the mixing or controllable valve assembly 45 can include a turbo-ejector proportional assembly, wherein the high pressure bleed port 36 entrains at least a portion of the low pressure bleed air of the low pressure bleed port 34, or "pulls" air from the low pressure bleed port 34, and provides the mixed, combined, or entrained air to the turbo air cycle machine 38. Stated another way, the turbo-ejector proportional assembly can simultaneously supply at least a portion of the low pressure bleed air to the compressor section 42 and entrain another portion of the low pressure bleed air with the high pressure bleed air. Embodiments of the disclosure can supply any ratio of low pressure bleed air to high pressure bleed air, such as up to 100% of a first bleed air, and 0% of the other bleed air. In another example embodiment of the disclosure, the supply ratio of the low pressure bleed air and high pressure bleed air can be selected to never go below, or alternatively, to never exceed, a predetermined ratio. For example, the low pressure bleed port 34 of the gas turbine engine 12 can be fluidly coupled with the compressor 42 of the turbo air cycle machine 38 by way of a first controllable valve 46. Additionally, the high pressure bleed port 36 of the gas turbine engine 12 can be directly fluidly coupled with the turbine 40 of the turbo air cycle machine 38 by way of a second controllable valve 50. Non-limiting examples of the first or second controllable valves 46, 50 can include a step-wise valve or continuous valve. The step-wise valve can operate in response to, related to, or as a function of the aircraft flight phase or the rotational speed of the gas turbine engine 12. For example, the rotational speed of the gas turbine engine 12 can include predetermined speed ranges or speed steps.

The low pressure bleed air provided by the low pressure bleed port 34 can be further provided to the turbine 40, downstream of the respective first and second valves 46, 50, wherein a fluid coupling providing the low pressure bleed air to the turbine 40 can include a check valve 52 biased in the direction from the low pressure bleed port 34 toward the high pressure bleed port 36 or the turbine 40 of the turbo air cycle machine 38. In this sense, the check valve 52 is configured such that fluid can only flow from the low pressure bleed port 34 to the high pressure bleed port 36 or the turbine 40 of the turbo air cycle machine 38.

Embodiments of the disclosure can be included wherein the check valve 52 is selected or configured to provide fluid traversal from the low pressure bleed port 34 toward the high pressure bleed port 36 under defined or respective pressures of the flow in the respective the low pressure bleed port 34 toward the high pressure bleed port 36. For example, the check valve 52 can be selected or configured to only provide fluid traversal, as shown, the air pressure of the high pressure bleed port 36 is lower or less than the air pressure of the low pressure bleed port 34. In another example, the check valve 52 can be selected or configured such that the valve 52 closes, or self-actuates to a closed position under back pressure, that is when the pressure of the high pressure bleed port 36 is higher or greater than the air pressure of the low pressure bleed port 36. Alternatively, embodiments of the disclosure can include a check valve 52 or turbo-ejector proportional assembly that is controllable to provide selective fluid traversal from the low pressure bleed port 34 toward the high pressure bleed port 36.

The compressor 42 of the turbo air cycle machine 38 can include a compressor output 54, and the turbine 40 can include a turbine output 56. The compressor output 54 and the turbine output 56 are fluidly combined downstream of the turbo air cycle machine 38. The flow mixer is arranged to fluidly combine the compressor output 54 and the turbine output 56 to a common mixed flow that is supplied to the bleed air inlet 49 of the ECS 48. In this sense, the bleed air system 20 preconditions the bleed air before the bleed air is received by the bleed air inlet 49 of the ECS 48.

In the illustrated embodiment of the flow mixer, the turbo-ejector 44 pressurizes the turbine output 56 as it traverses a narrow portion 58, or "throat" of the turbo-ejector 44, and fluidly injects the compressor output 54 into the narrow portion 58 of the turbo-ejector 44. The injection of the compressor output 54 into the pressurized turbine output 56 at the narrow portion 58 of the turbo-ejector 44 fluidly combines the respective outputs 54, 56. The turbo-ejector 44 or combined outputs 54, 56 are fluidly coupled downstream with the ECS 48 at a bleed air inlet 49. Embodiments of the disclosure can be included wherein the compressor output 54, the turbine output 56, or the turbo-ejector 44 (e.g. downstream from the narrow portion 58) can include a set of sensors 28.

The turbo-ejector 44, sometimes referred to as an "ejector pump" or an "ejector valve," works by injecting air from a higher pressure source into a nozzle at the input end of a venturi restriction, into which a lower pressure air source is also fed. Air from the higher pressure source is emitted downstream into the lower pressure flow at high velocity. Friction caused by the adjacency of the airstreams causes the lower pressure air to be accelerated ("entrained") and drawn through the venturi restriction. As the higher pressure air ejected into the lower pressure airstream expands toward the lower pressure of the low pressure air source, the velocity increases, further accelerating the flow of the combined or mixed airflow. As the lower pressure air flow is accelerated by its entrainment by the higher pressure source, the temperature and pressure of the low pressure source are reduced, resulting in more energy to be extracted or "recovered" from the turbine output. Non-limiting embodiments of the disclosure can be included wherein the high pressure air source is at a higher or greater temperature than the low pressure air source. However, in alternative embodiments of the disclosure, the entrainment and mixing process can occur without the high pressure air source having a higher or greater temperature than the low pressure air source. The above-described embodiments are application to the turbo-ejector 44 illustrated downstream of the turbo air cycle machine 38, as well as to the turbo-ejector embodiment of the proportional mixing assembly 45.

The aircraft 10 or bleed air system 20 can also include a controller module 60 having a processor 62 and memory 64. The controller module 60 or processor 62 can be operably or communicatively coupled to the bleed air system 20, including its sensors 28, the first valve 46, the second valve 50, and the ECS 48. The controller module 60 or processor 62 can further be operably or communicatively coupled with the sensors 28 dispersed along the fluid couplings of the bleed air system 20. The memory 64 can include random access memory (RAM), read-only memory (ROM), flash memory, or one or more different types of portable electronic memory, such as discs, DVDs, CD-ROMs, etc., or any suitable combination of these types of memory. The controller module 60 or processor 62 can further be configured to run any suitable programs. Non-limiting embodiments of the disclosure can be included wherein, for example, the controller module 60 or processor 62 can also be connected with other controllers, processors, or systems of the aircraft 10, or can be included as part of or a subcomponent of another controller, processor, or system of the aircraft 10.

A computer searchable database of information can be stored in the memory 64 and accessible by the controller module 60 or processor 62. The controller module 60 or processor 62 can run a set of executable instructions to display the database or access the database. Alternatively, the controller module 60 or processor 62 can be operably coupled to a database of information. For example, such a database can be stored on an alternative computer or controller. It will be understood that the database can be any suitable database, including a single database having multiple sets of data, multiple discrete databases linked together, or even a simple table of data. It is contemplated that the database can incorporate a number of databases or that the database can actually be a number of separate databases. The database can store data that can include, among other things, historical data related to the reference value for the sensor outputs, as well as historical bleed air system 20 data for the aircraft 10 and related to a fleet of aircraft. The database can also include reference values including historic values or aggregated values.

During gas turbine engine 12 operation, the bleed air system 20 supplies a low pressure bleed airflow 66 along the low pressure bleed port 34 and a high pressure bleed airflow 68 along the high pressure bleed port 36, as previously explained. The high pressure bleed airflow 68 is delivered to the turbine 40 of the turbo air cycle machine 38, which in turn interacts with the turbine to drive the rotation of the turbine 40. The high pressure bleed airflow 68 exits the turbine section 40 at the turbine output 56 as a turbine output airflow 70. A first portion of the low pressure bleed airflow 66 can be delivered to the compressor 42 of the turbo air cycle machine 38, and a second portion of the low pressure bleed airflow 66 can be delivered to the turbine 40 of the machine 38, depending on the operation of the check valve 52 or turbo-ejector proportional assembly, or the respective airflows 66, 68 of the respective low pressure bleed port 34 and high pressure bleed port 36, as explained herein. For example, embodiments of the disclosure can include operations wherein the airflow delivered to the turbine 40 can include entirely low pressure bleed airflow 66, no low pressure bleed airflow 66, or a portion therebetween. The second portion of the low pressure bleed airflow 66 can also be utilize to drive the rotation of the turbine 40.

The first portion of the low pressure bleed airflow 66 can be compressed by the rotation of the compressor 42, which is rotatably coupled with the turbine 40. The compressed low pressure bleed airflow 66 exits the compressor 42 at the compressor output 54 as a compressor output airflow 72. The turbine output airflow 70 and the compressor output airflow 72 are combined in the turbo-ejector 44 to form a combined airflow stream 74, which is further provided to the ECS 48. In this sense, the combined airflow stream 74 can be expressed as a composition or a ratio of the low pressure and high pressure bleed airflow 66, 68, or a composition of a ratio of the turbine and compressor output airflows 70, 72.

The compression of the low pressure airflow 66, by the compressor 42, generates a higher pressure and higher temperature compressor output airflow 72, compared with the low pressure airflow 66. Additionally, the airflows received by the turbine 40, that is, the high pressure airflow 68 and selective low pressure airflow 66 via the check valve 52 or turbo-ejector proportional assembly, generates a lower pressure and a lower temperature turbine output airflow 70, compared with the turbine 40 input airflows 66, 68. In this sense, the compressor 42 outputs or emits a hotter and higher pressure airflow 72, while the turbine 40 outputs or emits a cooler and lower pressure airflow 70, compared with the relative input airflows 66, 68.

The controller module 60 or processor 62 can be configured to operably receive a bleed air demand, generated by, for example, the ECS 48. The bleed air demand can be provided to the controller module 60 or processor 62 by way of a bleed air demand signal 76, which can include bleed air demand characteristics included, but not limited to, flow rate, temperature, or pressure. In response to the bleed air demand signal 76, the controller module 60 or processor 62 can operably supply proportional amounts of the low pressure bleed airflow 66 and high pressure bleed airflow 68 to the turbo air cycle machine 38. The proportionality of the low pressure and high pressure bleed airflows 66, 68 can be controlled by way of the respective first or second controllable valves 46, 50, and by selective operation of the check valve 52 or turbo-ejector proportional assembly.

The proportional supplying of the low pressure and high pressure bleed airflows 66, 68 can be directly or geometrically proportional to the turbine output airflow 70 and compressor output airflow 72, or the turbine air cycle machine 38 operations. The turbine output airflow 70 and compressor output airflow 72 are combined downstream of the turbo air cycle machine 38, and the combined airflow stream 74 is provided to the ECS 48. In one non-limiting example, the compressor output airflow 72 can drive the turbine output airflow 70 into the narrow portion 58 and mix under sonic conditions. The mixed flow pressure will recover statically through the combined airflow stream 74 to output the turbo-ejector 44 at desired conditions. In this sense, the combined airflow stream 74 is conditioned by way of operation of the bleed air system 20, controllable valves 46, 50, check valve 52, turbo-ejector proportional assembly, turbo air cycle machine 38, the combining of the turbine output airflow 70 and the compressor output airflow 72, or any combination thereof, to meet the ECS 48 demand for bleed air.

One of the controller module 60 or processor 62 can include all or a portion of a computer program having an executable instruction set for determining the bleed air demand of the ECS 48, proportionally supplying the low pressure or high pressure bleed airflows 66, 68, operating the controllable valves 46, 50, the check valve's 52 or turbo-ejector proportional assembly's operation in response to the respective high pressure and low pressure airflows 66, 68, or a combination thereof. Regardless of whether the controller module 60 or processor 62 controls the operation of the bleed air system 20, the program can include a computer program product that can include machine-readable media for carrying or having machine-executable instructions or data structures stored thereon. Such machine-readable media can be any available media, which can be accessed by a general purpose or special purpose computer or other machine with a processor. Generally, such a computer program can include routines, programs, objects, components, data structures, and the like, that have the technical effect of performing particular tasks or implementing particular abstract data types. Machine-executable instructions, associated data structures, and programs represent examples of program code for executing the exchange of information as disclosed herein. Machine-executable instructions can include, for example, instructions and data, which cause a general-purpose computer, special purpose computer, or special purpose processing machine to perform a certain function or group of functions.

While the bleed air characteristics of the low pressure or high pressure bleed airflows 66, 68 can remain relatively consistent or stable during a cruise portion of a flight by the aircraft 10, varying aircraft 10 or flight characteristics, such as altitude, speed, heading, solar cycle, or geographic aircraft location can produce inconsistent airflows 66, 68 in the bleed air system 20. Thus, the controller module 60 or processor 62 can also be configured to operate the bleed air system 20, as explained herein, in response to receiving a set of sensor input values received by the sensors 28 dispersed along the fluid couplings of the bleed air system 20. For example, the controller module 60 or processor 62 can include predetermined, known, expected, estimated, or calculated values for the set of airflows 66, 68, 70, 72, 74 traversing the bleed air system 20. In response to varying aircraft 10 or flight characteristics, the controller module 60 or processor 62 can alter the proportional supplying of the low pressure or high pressure bleed airflows 66, 68 in order to meet the bleed air demand for the ECS 48. Alternatively, the memory 64 can include a database or lookup table such that a proportional supplying values related to the low pressure or high pressure bleed airflows 66, 68 can be determined in response to the controller module 60 receiving a set or subset of sensor 28 readings, measurements, or the like.

While sensors 28 are described as "sensing," "measuring," or "reading" respective temperatures, flow rates, or pressures, the controller module 60 or processor 62 can be configured to sense, measure, estimate, calculate, determine, or monitor the sensor 28 outputs, such that the controller module 60 or processor 62 interprets a value representative or indicative of the respective temperature, flow rate, pressure, or combination thereof. Additionally, sensors 28 can be included proximate to, or integral with additional components not previously demonstrated. For example, embodiments of the disclosure can include sensors 28 located to sense the combined airflow stream 74, or can include sensors 28 located within the narrow portion 58, or "throat" of the turbo-ejector 44.

In one non-limiting example of responsive operation, if the high pressure bleed airflow 68 received by the high pressure bleed port 36 includes a higher than expected pressure, or a higher than expected temperature, as sensed by a sensor 28, the controller module 60 or processor 62 can operate the bleed air system 20 to partially close the second valve 50. In another non-limiting example of responsive operation, if the low pressure bleed airflow 66 received by the low pressure bleed port 34 includes a lower than expected pressure, or a lower than expected temperature, as sensed by a sensor 28, the controller module 60 or processor 62 can operate the bleed air system 20 partially open the second valve 50, which increases the high pressure bleed airflow 68. The increase in high pressure bleed airflow 68, in turn, increases the rotation of the turbine 40, increasing the compression of the compressor 42. The increase in compression of the compressor 42 raises the pressure and temperature of the compressor output airflow 70.

Embodiments of the disclosure can be included wherein the controller module 60 or processor 62 can be configured to operate the bleed air system 20 to account for sensor 28 measurements in the set or a subset of the airflows 66, 68, 70, 72, 74.

In another embodiment of the disclosure, the bleed air system 20 can operate without feedback inputs, that is, without the controller module 60 or processor 62 receiving sensed information from the sensors 28. In this alternative configuration, the controller module 60 or processor 62 can be configured to operate the first or second valves 46, 50, and the like based on a step-wise operation of the aircraft 10, such as the aircraft 10 flight phases.

In one non-limiting example configuration of the bleed air system 20, wherein the ambient air outside of the aircraft 10 or gas turbine engine 12 has an air pressure of 2.72 pounds per square inch, absolute (psiA) and a temperature of −69.7 degrees Fahrenheit (F), the low pressure bleed airflow can include a pressure of 17.87 psi, gage (psiG) and a temperature of 287.09 degrees F., while high pressure bleed airflow can include a pressure of 57.34 psiG and a temperature of 618.44 degrees. In this example, a ratio of low pressure bleed airflow 66 to high pressure bleed airflow 68 can be 53.77% to 46.23%. This ratio can operate the turbo air cycle machine 38 to produce a turbine output airflow 70 having a pressure of 34.91 psiG and a temperature of 182.35 degrees F., while the compressor output airflow 72 can include a pressure of 67.9 psiG and a temperature of 682.59 degrees F. The turbo-ejector 44 can be configured to combine the turbine output airflow 70 and the compressor output airflow 72 to provide a combined airflow stream 74 including a pressure of 47.92 psiG and a temperature of 454.27 degrees F. The aforementioned example configuration and values are merely one non-limiting example of the bleed air system 20 described herein.

Figure 4:
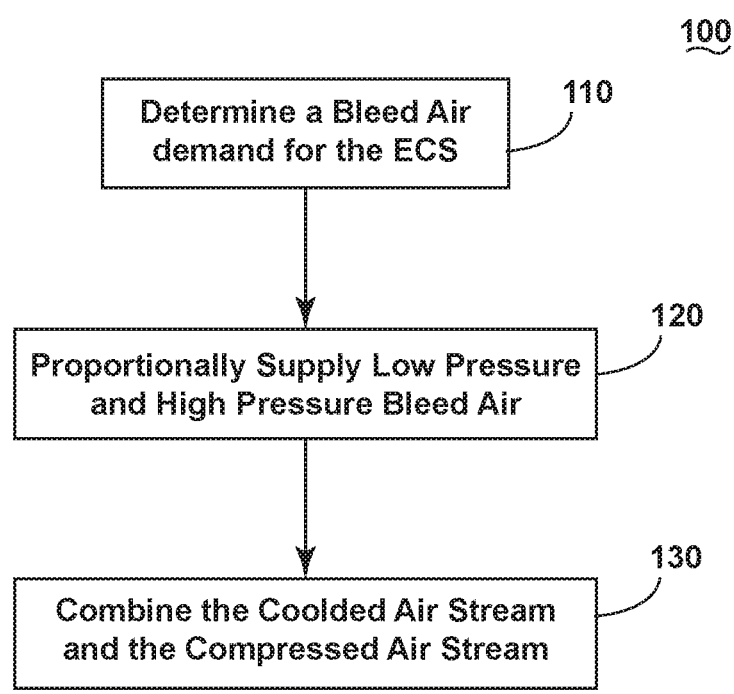
FIG. 4 is an example a flow chart diagram of demonstrating a method of providing bleed air to the environmental control system in accordance with various aspects described herein.

FIG. 4 illustrates a flow chart demonstrating a non-limiting example method 100 of providing bleed air to the ECS 48 of an aircraft 10 using a gas turbine gas turbine engine 12. The method 100 begins by determining a bleed air demand for the ECS 110. The determining the bleed air demand for the ECS 110 can include determining at least one of an air pressure, an air temperature, or a flow rate demand for the ECS 48, or a combination thereof. The bleed air demand can be a function of at least one of the number of aircraft 10 passengers, aircraft 10 flight phase, or operational subsystems of the ECS 48. The bleed air demand can be determined by the ECS 48, the controller module 60, or the processor 62, based on the bleed air demand signal 76.

Next, the controller module 60 or the processor 62 operably controls the proportional mixing valve assembly 45 to proportionally supply the low pressure and high pressure bleed air 120 such that turbo air cycle machine 38 emits a cooled air stream from the turbine 40 and a compressed air stream from the compressor 42. Embodiments of the disclosure can include, but are not limited to, supplying up to 100% of the combined airflow stream 74 of one of the low pressure or high pressure bleed airflow 66, 68, and 0% of the corresponding other of the low pressure or high pressure bleed airflow 66, 68. Another example embodiment of the disclosure can include, but is not limited to, step-wise proportionally supplying the low pressure and high pressure bleed airflows 66, 68, wherein the step-wise supplying is related to, or is a function of the aircraft 10 flight phase or rotational speed of the gas turbine engine 12. The proportionally supplying of the bleed air 120 can include continuously proportionally supplying the bleed air 120, that is, repeatedly altering the proportional supplying of the low pressure and high pressure bleed airflows 66, 68 over a period of time, or indefinitely during the flight of the aircraft 10.

The method 100 continues by combining the cooled air stream and the compressed air stream 130 to form a conditioned or combined airflow stream 74. The proportional supplying the low pressure and the high pressure bleed air 120 is controlled by the controller module 60 or processor 62 such that the combined airflow stream 74 meets the determined bleed air demand for the ECS.

The sequence depicted is for illustrative purposes only and is not meant to limit the method 100 in any way as it is understood that the portions of the method can proceed in a different logical order, additional or intervening portions can be included, or described portions of the method can be divided into multiple portions, or described portions of the method can be omitted without detracting from the described method.

Many other possible embodiments and configurations in addition to that shown in the above figures are contemplated by the present disclosure. For example, embodiments of the disclosure can be included wherein the second valve 50 could be replaced with a bleed ejector or mixing valve also coupled with the low pressure bleed port 34. In another non-limiting example, the turbo-ejector 44, the compressor output 54, or the turbine output 56 can be configured to prevent backflow from downstream components from entering the turbo air cycle machine 38. In yet another non-limiting example embodiment of the disclosure, the check valve 52 or turbo-ejector proportional assembly can include, or can be replaced by a third controllable valve, and controlled by the controller module 60 as explained herein, to operate or effect a ratio of low pressure bleed airflow 66 and high pressure bleed airflow 68 supplied to the turbine 40. Additionally, the design and placement of the various components such as valves, pumps, or conduits can be rearranged such that a number of different in-line configurations could be realized.

The embodiments disclosed herein provide a method and aircraft for providing bleed air to an environmental control system. The technical effect is that the above described embodiments enable the preconditioning of bleed air received from a gas turbine engine such that the conditioning and combining of the bleed air is selected to meet a bleed air demand for the environmental control system. One advantage that can be realized in the above embodiments is that the above described embodiments have superior bleed air conditioning for the ECS without wasting excess heat, compared with traditional pre-cooler heat exchanger systems. Another advantage that can be realized is that by eliminating the waste of excess heat, the system can further reduce bleed extraction from the engine related to the wasted heat. By reducing bleed extraction, the engine operates with improved efficiency, yielding fuel cost savings and increasing operable flight range for the aircraft.

Yet another advantage that can be realized by the above embodiments is that the bleed air system can provide variable bleed air conditioning for the ECS. The variable bleed air can meet a variable demand for bleed air in the ECS due to a variable ECS load, for example, as subsystems are operated or cease to operate.

To the extent not already described, the different features and structures of the various embodiments can be used in combination with each other as desired. That one feature cannot be illustrated in all of the embodiments is not meant to be construed that it cannot be, but is done for brevity of description. Thus, the various features of the different embodiments can be mixed and matched as desired to form new embodiments, whether or not the new embodiments are expressly described. Moreover, while "a set of" various elements have been described, it will be understood that "a set" can include any number of the respective elements, including only one element. Combinations or permutations of features described herein are covered by this disclosure.

This written description uses examples to disclose embodiments of the invention, including the best mode, and also to enable any person skilled in the art to practice embodiments of the invention, including making and using any devices or systems and performing any incorporated methods. The patentable scope of the invention is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An aircraft comprising:
an environmental control system having a bleed air inlet;
a gas turbine engine having a low pressure bleed air supply and a high pressure bleed air supply;
a turbo air cycle machine having rotationally coupled turbine and compressor sections;
a controllable valve assembly configured to selectively fluidly couple the low pressure bleed air supply to the compressor section, the low pressure bleed air supply to the turbine section, and the high pressure bleed air supply to the turbine section; and a turbo-ejector fluidly combining fluid outputs from the turbine and compressor sections into a common flow that is supplied to the bleed air inlet of the environmental control system, wherein the low pressure bleed air supply includes a first low pressure bleed air supply directly fluidly coupled to the compressor section and a second low pressure bleed air supply fluidly coupling the first low pressure bleed air supply to the high pressure bleed air supply, wherein the controllable valve assembly further comprises:

a first controllable valve provided along the first low pressure bleed air supply upstream of the second low pressure bleed air supply;

a second controllable valve provided along the high pressure bleed air supply; and a check valve provided along the second low pressure bleed air supply.

2. The aircraft of claim 1, wherein the environmental control system comprises an air-conditioning subsystem and a de-icing subsystem.

3. The aircraft of claim 1 wherein the controllable valve assembly is configured to simultaneously supply the low pressure bleed air supply to the compressor section and to the high pressure bleed air supply.

4. The aircraft of claim 1, further comprising a controller module configured to controllably operate at least one of the controllable valve assembly or the turbo-ejector.

5. The aircraft of claim 1, wherein the controllable valve assembly is configured to selectively supply a combination of the low pressure bleed air supply and the high pressure bleed air supply to the turbine section.

6. An aircraft comprising:

an environmental control system having a bleed air inlet;

a gas turbine engine having a low pressure bleed air supply and a high pressure bleed air supply;

a turbo air cycle machine fluidly coupled to the bleed air inlet and comprising:

a compressor selectively fluidly coupled to the low pressure bleed air supply and having a compressor outlet emitting a compressed air stream; and a turbine selectively fluidly coupled the low pressure air supply and selectively fluidly coupled to the high pressure bleed air supply and having a turbine outlet emitting a cooled air stream; and a turbo-ejector fluidly coupled to the compressor outlet and the turbine outlet, wherein the low pressure bleed air supply includes a first low pressure bleed air supply directly fluidly coupled to the compressor and a second low pressure bleed air supply fluidly coupling the first low pressure bleed air supply to the high pressure bleed air supply, wherein the aircraft further comprises a controllable valve assembly upstream of the turbo air cycle machine and configured to selectively fluidly couple the first low pressure bleed air supply to the compressor and the second low pressure bleed air supply, and the high pressure bleed air supply to the turbine, and wherein the controllable valve assembly comprises:

a first controllable valve provided along the first low pressure bleed air supply upstream of the second low pressure bleed air supply;

a second controllable valve provided along the high pressure bleed air supply; and a check valve provided along the second low pressure bleed air supply.

7. The aircraft of claim 6, wherein the turbo-ejector further comprises a first inlet, a second inlet, and an outlet, with the second inlet having a narrow portion forming a throat.

8. The aircraft of claim 7, wherein the turbine outlet is fluidly coupled to the first inlet, and the compressor outlet is fluidly coupled to the second inlet.

9. The aircraft of claim 8, wherein the compressed air stream and the cooled air stream combine within the turbo-ejector to form a conditioned air stream exiting the turbo-ejector through the outlet.

10. The aircraft of claim 9, wherein the outlet of the turbo-ejector is fluidly coupled to the bleed air inlet, thereby supplying the conditioned air stream to the environmental control system.

11. The aircraft of claim 9, further comprising a controller module in signal communication with the environmental control system and the turbo air cycle machine.

12. The aircraft of claim 11, wherein the controller module is configured to receive a signal indicative of a bleed air demand for the environmental control system, and to supply proportional amounts of the low pressure bleed air supply and the high pressure bleed air supply to form the conditioned air stream meeting the bleed air demand.

13. The aircraft of claim 6, wherein the environmental control system comprises an air-conditioning subsystem and a de-icing subsystem.

\* \* \* \* \*